United States Patent Office 3,812,122
Patented May 21, 1974

3,812,122
PROCESS FOR MAKING OXYALKYLATED
POLYAMINO-1,3,5-TRIAZINES
Wolfgang Lengsfeld, Limburgerhof, Germany, assignor to BASF Wyandotte Corporation, Wyandotte, Mich.
No Drawing. Filed Apr. 12, 1972, Ser. No. 243,476
Claims priority, application Germany, Apr. 16, 1971, P 21 18 868.1
Int. Cl. C07d 55/20, 55/24
U.S. Cl. 260—249.6
5 Claims

ABSTRACT OF THE DISCLOSURE

A process for making oxyalkylated polyamino-1,3,5-triazines wherein the oxyalkylation is carried out at elevated temperatures in the presence of N,N-dialkyl acid amides is disclosed.

BACKGROUND

1. Field of the invention

A process for making oxyalkylated polyamino-1,3,5-triazines wherein the oxyalkylation is carried out at elevated temperatures in the presence of N,N-dialkyl acid amides is disclosed.

2. Description of the prior art

The oxyalkylation of polyamino-1,3,5-triazines in the presence of low molecular weight dialkylsulfoxides as solvent is known. This procedure is beset with the disadvantage that the relatively expensive dialkylsulfoxides can only with difficulty be quantitatively removed by distillation from the reaction solution, this being due to their high boiling points and low thermal stabilities. During distillation, the solvent is partially decomposed. This causes the generation of trace amounts of evil smelling side products which can only be difficultly removed from the oxyalkylated polyamino-1,3,5-triazines. According to disclosures in U.S. Pat. 3,399,151, attempts to oxypropylate melamine in the presence of dimethyl formamide as solvent, were not successful.

SUMMARY OF THE INVENTION

It has been found that odorless oxyalkylated polyamino-1,3,5-triazines can be prepared by a simple procedure, from alkylene oxides and polyamino-1,3,5-triazines in the presence of a basic catalyst by oxyalkylating the triazine in the presence of an N,N-dialkyl acid amide and at temperatures between 90°–200° C.

DESCRIPTION OF THE PREFERRED EMBODIMENTS

The process of this invention is conveniently carried out by using amino-1,3,5-triazines which have at least two amino groups found in the molecule. These triazines can be considered to be 2,4-diamino-1,3,5-triazines of Formula I:

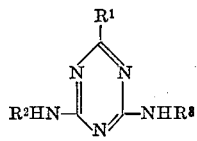

wherein $R^1$ is selected from the group consisting of hydrogen, alkyl or cycloalkyl with from 1–25 and preferably 1–6 carbon atoms, alkylene with 3–20 and preferably 3–6 carbon atoms, aryl with from 6–10 carbon atoms, or an $NR^2R^3$ group. $R^2$ and $R^3$ are independently selected from the group consisting of hydrogen, an alkyl with 1–6 and preferably 1–4 carbon atoms and aryl with 6–10 carbon atoms. Illustrative of the compounds of Formula I are 6-butyl-2,4-diamino-1,3,5-triazine;
6-stearyl-2,4-diamino-1,3,5-triazine;
6-butenyl-2,4-diamino-1,3,5-triazine;
6-dimethyl-amino-2,4-diamino-1,3,5-triazine;
2,4-methylamino-1,3,5-triazine;
6-ethyl-2,4-methylamino-1,3,5-triazine;
6-cyclohexyl-2-amino-4-methylamino-1,3,5-triazine and preferably 2,4-diamino-1,3,5-triazine;
6-phenyl-2,4-diamino-1,3,5-triazine and triamino-1,3,5-triazines, i.e. melamine.

Reacted with the triazines of Formula I are alkylene oxides of from 2 to 6 carbon atoms which include but are not limited to the following: butyleneoxide, epichlorohydrin, and preferably ethylene oxide and propylene oxide; and alkylene aryl oxides, e.g. styrene oxide.

The various alkylene oxides may be employed singularly in alternating sequence or as mixtures. The molecular ratio of polyamino-1,3,5-triazine to alkylene oxide can be varied within wide limits. Conventionally a molecular ratio of polyamino-1,3,5-triazine to alkylene oxide of 1:3 up to 1:100 is used, but preferably a ratio of 1:4 to 1:40 and especially preferred is a ratio of 1:4 to 1:25. Depending on the type of alkylene oxide used, and on the molecular ratio of polyamino-1,3,5-triazine to alkylene oxide, oxyalkylated polyamino-1,3,5-triazines with a wide variety of useful properties are obtained. For instance, propoxylation products from 1 mole of melamine and 6 moles of propylene oxide have about 4 reactive hydroxyl end groups, products resulting from 1 mole melamine and 12 moles propylene oxide generally have about 6 reactive hydroxyl end groups. As the following table shows, the viscosity of the oxypropylated melamine products generally decreases with increasing propylene oxide content:

TABLE

| Mole ratio melamine/P.O.: | $\eta(25°$ C., cps.) |
|---|---|
| 1:6 | >100,000 |
| 1:12 | 50,000 |
| 1:15 | 14,000 |
| 1:18 | 5,000 |
| 1:24 | 2,000 |

Oxyalkylation is carried out at temperatures between 90 and 200° C., preferably between 110°–140° C., in the presence of organic or inorganic basic catalysts and N,N-dialkyl acid amides as solvents.

The usual catalysts are alkali hydroxides, such as NaOH and preferably KOH and alkali alkoxides with 1–4 carbon atoms in the alkyl group such as for instance, potassium ethylate, potassium propylate, potassium isopropylate, sodium butylate and preferably sodium methylate, potassium methylate and sodium ethylate. The catalysts are used in amounts of from 0.01 to 0.2 mole, preferably 0.04 to 0.08 mole per mole polyamino-1,3,5-triazine.

It is an essential feature of the new manufacturing procedure that the oxyalkylation of the polyamino-1,3,5-triazines is carried out in the presence of N,N-dialkyl acid amides as solvents. Such N,N-dialkyl acid amides have formulas such as II and III.

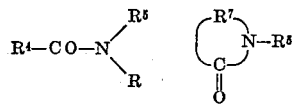

wherein $R^4$ is selected from the group consisting of hydrogen, or alkyl with from 1 to 6 and preferably 1 to 2 carbon atoms, $R^5$ and $R^6$ are independently selected from the group consisting of alkyl with 1–6 and preferably 1–2 carbon atoms, and when taken together R⁵ and R⁶ are parts of a heterocyclic ring system containing 5 to 7 atoms. R⁷ is an alkylene group with 2–5 and preferably 3–4 carbon atoms. Suitable N,N-dialkyl acid amides include but are not limited to N,N-diethyl propionamide, N,N-diethyl acetamide, N,N-diethyl formamide, N-methyl pyridone, and preferably N,N-dimethyl acetamide, N,N-dimethyl formamide and N-methyl pyrrolidone. The N,N-dialkyl acid amides can be used singly or as mixtures.

The N,N-dialkyl acid amides can also be diluted with such other solvents, which are inert under the reaction conditions, as for instance aromatic hydrocarbons such as benzene, toluene, xylene, chlorobenzene and ortho-dichlorobenzene, such cycloaliphatic hydrocarbons as cyclohexane and such chloroparaffins as methylene chloride, chloroform or ethylene chloride may also be used as inert diluents. However, in these cases care has to be taken that at least 20% by weight of the total solvent mixture must be present as N,N-dialkyl acid amide. The amount of solvent is suitably chosen in such a manner that the reaction mixture has a solids content between 5–50% by weight, preferably between 10–35% by weight, based on the total weight of the reaction mixture.

Specifically, the oxyalkylated polyamino-1,3,5-triazines are manufactured by the following procedure: the basic catalyst and the polyamino-1,3,5-triazine are dissolved in the corresponding N,N-dialkyl acid amide, or suspended therein, and then the alkylene oxide is introduced at elevated temperature at such a rate as it will react directly, for instance over a period of from 1–10 hours, preferably 3–7 hours at atmospheric pressure. Alternately the alkylene oxide can be fed and reached under elevated pressure of from 1–10 and preferably 2–6 atmospheres. As soon as the polyamino-1,3,5-triazine-alkylene oxide adduct has gone into solution, the N,N-dialkyl acid amide can be partially or completely removed by distillation under reduced pressure and the oxyalkylation then be continued up to the desired molecular weight. The oxyalkylated polyamino-1,3,5-triazines are subsequently isolated from the reaction mixture according to known methods. To this effect, in order to remove the basic catalysts, the reaction mixture is neutralized with inorganic acids or acid reacting salts, any possibly present residual solvent as well as possibly present low boiling side products are removed by stripping under reduced pressure, and the distillation residue, consisting of oxyalkylated polyamino-1,3,5-triazines, is filtered.

The distilled solvents are regenerated according to conventional procedures.

The oxyalkylated polyamino-1,3,5-triazines, prepared according to this invention, have molecular weights from 400 to 4000 and, depending on the type of product, viscosities of from 100 to greater than 100,000 centipoises at 25° C. The highly viscous products can be diluted for better handling, for instance for the preparation of polyurethane foams they may be diluted with suitable polyols, such as polypropylene glycols or low viscosity triols.

The oxyalkylated polyamino-1,3,5-triazines are used as textile auxiliaries, paper processing aids and preferably for the manufacture of rigid, semi-rigid and flexible polyurethane foams. These products are furthermore surface active agents and emulsifiers.

The procedure according to this invention is further detailed by the following examples. All parts mentioned in the examples are parts by weight.

EXAMPLE I

To a mixture consisting of 1000 parts dimethyl formamide, 126 parts melamine and 2.5 parts potassium hydroxide at 130° C. over a period of about 4 hours, 354 parts propylene oxide are slowly added while stirring and maintaining a nitrogen atmosphere. The clear, light yellow solution is stirred for an additional hour at 130° C. and subsequently dimethylformamide is distilled off at 2 mm. Hg pressure until the reaction mixture has reached a pot temperature of 130° C. By weighing it is determined that the melamine has added 314 parts propylene oxide.

EXAMPLE II

To an oxypropylated melamine which was prepared according to the procedure of Example I, over a period of 5 hours at 130° C., 392 parts propylene oxide are slowly added while maintaining a nitrogen atmosphere. The reaction mixture is stirred for 30 minutes at 130° C. and then the unreacted propylene oxide is removed by distillation under reduced pressure at 100° C. The basic reaction mixture is neutralized with phosphoric acid, volatile side products are removed by distillation at 2 mm. Hg pressure and 130° C. and then the distillation residue is filtered. By weighing it is determined that the melamine has added a total of 691 parts propylene oxide.

The oxypropylated melamine has an OH number of 362 and a viscosity of 58,000 cps. at 25° C. The product is clearly soluble in cold water.

EXAMPLE III

Example II is repeated except 554 parts propylene oxide are used instead of 392 parts to obtain an oxypropylated melamine which contains 858 parts propylene oxide, has an OH number of 337 and a viscosity of 14,150 cps. at 25° C.

EXAMPLE IV

To a mixture consisting of 500 parts dimethyl formamide, 93.5 parts 6-phenyl-2,4-diamino-1,3,5-triazine and 1.25 parts potassium hydroxide, 116 parts propylene oxide are added dropwise at 130° C. over about 4 hours while stirring and maintaining a nitrogen atmosphere. The clear solution is stirred for one hour at 130° C. and then dimethyl formamide is removed by distillation at 2 mm. Hg pressure until the reaction mixture reaches a pot temperature of 130° C. To this mixture an additional 237 parts propylene oxide are added dropwise over about 5 hours. The reaction mixture is stirred for a further 30 minutes at 130° C. and then the unreacted propylene oxide is removed by distillation at 100° C. under reduced pressure. The basic reaction mixture is neutralized with phosphoric acid. Volatile side products are distilled off at 2 mm. Hg and 130° C. and the distillation residue is filtered.

The oxypropylated 6-phenyl-2,4-diamino-1,3,5-triazine to which a total of 355 parts propylene oxide have been condensed, has an OH number of 247 and a viscosity of 32,400 cps. at 25° C.

EXAMPLE V

To a mixture consisting of 1000 parts dimethyl formamide, 126 parts melamine and 2.5 parts potassium hydroxide, 395 parts propylene oxide are added dropwise with stirring at 115° C. over a period of about 5 hours while maintaining a nitrogen atmosphere. The clear solution is stirred for one hour at 130° C. and subsequently the dimethyl formamide is removed by distillation of 2 m. Hg and 130° C. The oxypropylated melamine has added 348 parts propylene oxide.

EXAMPLE VI

Proceeding according to Example V, but introducing 347 parts propylene oxide over about 4 hours at 120° C. into the basic melamine dimethyl formamide mixture, an oxypropylated melamine which contains 310 parts condensed propylene oxide is obtained.

EXAMPLE VII

To a mixture consisting of 1000 parts N-methyl-pyrrolidone, 126 parts melamine and 2.5 parts potassium hydroxide, 349 parts of propylene oxide are added dropwise with stirring at 120° C. over a period of 4 hours and while maintaining a nitrogen atmosphere. From the reaction mixture the solvent is distilled off under reduced pressure, and an additional 2.5 parts potassium hydroxide are added at 120° C., as well as 360 parts of propylene oxide over 4 hours.

After neutralizing the reaction mixture with phosphoric acid, removing volatile side products by distillation and filtration of the distillation residue, an oxypropylated melamine is obtained, which contains 699.5 parts condensed propylene oxide and has an OH number of 332.

EXAMPLE VIII

To a reaction mixture consisting of 1000 parts dimethylacetamide, 126 parts melamine and 2.5 parts potassium hydroxide, 344 parts of propylene oxide are added at 120° C. over 6.5 hours, with stirring and while maintaining a nitrogen atmosphere. After neutralizing the reaction mixture with phosphoric acid, the solvent and volatile side products are distilled off at 0.2 mm. Hg and 120° C. and the distillation residue is filtered.

The embodiments of the invention in which an exclusive property or privilege is claimed are defined as follows:

1. In the process for making oxyalkylated polyamino-1,3,5-triazines by reacting an alkylene oxide with polyamino-1,3,5-triazine in the presence of a basic oxyalkylating catalyst the improvement which comprises carrying the process out in the presence of an N,N-dialkyl acid amide solvent and at a temperature between 90° and 200° C., (1) wherein the polyamino-1,3,5-triazine has the formula

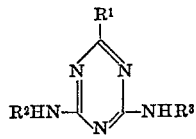

wherein $R^1$ is selected from the group consisting of hydrogen, alkyl or cycloalkyl having 1 to 25 carbon atoms, alkylene having 3 to 20 carbon atoms, carbocyclic aryl having 6 to 10 carbon atoms and $NR^2R^3$, and each $R^2$ and $R^3$ is independently selected from the group of hydrogen, alkyl having 1 to 6 carbon atoms and carbocyclic aryl having 6 to 10 carbon atoms, (2) wherein the alkylene oxide is selected from the group consisting of alkylene oxides having from 2 to 6 carbon atoms, epichlorohydrin, styrene oxide and mixtures thereof, and (3) wherein the N,N-dialkyl acid amine is selected from the group consisting of

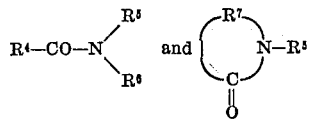

wherein $R^4$ is selected from the group consisting of hydrogen and alkyl having from 1 to 6 carbon atoms, $R^5$ and $R^6$ are each independently selected from the group consisting of alkyl having from 1 to 6 carbon atoms and when taken together $R^5$ and $R^6$ form with the adjoining nitrogen atoms a heterocyclic group selected from pyrrolidyl, piperidyl and hexamethylenimineyl, and $R^7$ is an alkylene group containing from 2 to 5 carbon atoms.

2. The process of claim 1 wherein the reaction mixture has a solids content between 5 and 50 percent by weight based on the total weight of the reaction mixture.

3. The process of claim 1 wherein the solvent is diluted with up to 80 percent by weight of the total solvent present with an inert diluent.

4. The process of claim 1 wherein the reaction is carried out at a temperature between 110° and 140° C.

5. The process of claim 1 wherein the reaction is maintained for a period of 1 to 10 hours.

References Cited
UNITED STATES PATENTS 3,096,147    7/1963    Fulmer _____ 260—249.9 X
3,399,151    8/1968    Kaiser _____ 260—249.9 X JOHN M. FORD, Primary Examiner U.S. Cl. X.R.

260—249.9, 2.5 BE, 2.5 EP